United States Patent
Elias et al.

(10) Patent No.: US 10,759,288 B2
(45) Date of Patent: Sep. 1, 2020

(54) CHARGING DEVICE FOR INDUCTIVELY CHARGING AN ELECTRICAL ENERGY STORE OF A MOTOR VEHICLE AND METHOD FOR OPERATING A CHARGING DEVICE

(71) Applicant: AUDI AG, Ingolstadt (DE)

(72) Inventors: Björn Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 376 days.

(21) Appl. No.: 15/573,910

(22) PCT Filed: May 12, 2016

(86) PCT No.: PCT/EP2016/060775
§ 371 (c)(1),
(2) Date: Nov. 14, 2017

(87) PCT Pub. No.: WO2016/184790
PCT Pub. Date: Nov. 24, 2016

(65) Prior Publication Data
US 2018/0354380 A1      Dec. 13, 2018

(30) Foreign Application Priority Data

May 16, 2015    (DE) .................. 10 2015 006 310

(51) Int. Cl.
*H02J 7/00*           (2006.01)
*B60L 53/12*          (2019.01)
(Continued)

(52) U.S. Cl.
CPC ........... *B60L 53/12* (2019.02); *B60L 11/1829* (2013.01); *B60L 53/34* (2019.02); *B60L 53/38* (2019.02);
(Continued)

(58) Field of Classification Search
USPC ....................................................... 320/108
See application file for complete search history.

(56) References Cited

U.S. PATENT DOCUMENTS 5,646,500 A  *  7/1997  Wilson ................... H02J 7/022
                                                320/108
5,654,621 A  *  8/1997  Seelig .................... H01F 38/14
                                                320/108
(Continued)

FOREIGN PATENT DOCUMENTS

CN       101225651 A       7/2008
CN       103089550 A       5/2013
(Continued)

OTHER PUBLICATIONS

Office Action dated Aug. 15, 2019, in corresponding Chinese Application No. 201680028981.8; 13 pages.

(Continued)

*Primary Examiner* — Samuel Berhanu
(74) *Attorney, Agent, or Firm* — Maier & Maier, PLLC

(57) ABSTRACT

A charging device for inductively charging an electrical energy store of a motor vehicle provided with a primary coil, which is designed to induce a voltage in a secondary coil of the motor vehicle for charging the electrical energy store, and with a lifting mechanism, which is designed to move the primary coil between a stored position and a charging position. The charging device is provided with a control device, which is adapted for operating the lifting mechanism in a deicing mode in which the lifting mechanism is moved according to a predeterminable movement cycle between the stored position and the charging position.

8 Claims, 1 Drawing Sheet

(51) Int. Cl.
  *B60L 53/34* (2019.01)
  *B60L 53/38* (2019.01)
  *B60L 11/18* (2006.01)
  *H02J 50/90* (2016.01)
  *H02J 50/10* (2016.01)
  *H02J 7/02* (2016.01)
(52) U.S. Cl.
  CPC ............ *H02J 7/0042* (2013.01); *H02J 7/025* (2013.01); *H02J 50/10* (2016.02); *H02J 50/90* (2016.02); *B60L 2240/662* (2013.01); *B60L 2240/667* (2013.01); *Y02T 10/7005* (2013.01); *Y02T 10/7088* (2013.01); *Y02T 10/7291* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y02T 90/16* (2013.01)

(56) References Cited

U.S. PATENT DOCUMENTS

| | | | |
|---|---|---|---|
| 5,821,731 | A | 10/1998 | Kuki et al. |
| 2009/0011616 | A1 | 1/2009 | Patwardhan |
| 2010/0308768 | A1 | 12/2010 | Dower |
| 2011/0199047 | A1 | 8/2011 | Fujii |
| 2014/0021914 | A1 | 1/2014 | Martin et al. |
| 2014/0035520 | A1* | 2/2014 | Nakayama ............ H02J 50/10 320/108 |
| 2014/0202817 | A1 | 7/2014 | Nitti |
| 2015/0137744 | A1* | 5/2015 | Lee ................ B60L 50/66 320/108 |
| 2015/0306974 | A1* | 10/2015 | Mardall ............ H01M 10/625 320/150 |
| 2016/0052414 | A1* | 2/2016 | Bell ................. G01M 17/007 320/108 |
| 2016/0280084 | A1* | 9/2016 | McGrath ............... B60L 5/42 |
| 2017/0136896 | A1* | 5/2017 | Ricci .................. B60L 11/182 |
| 2017/0136897 | A1* | 5/2017 | Ricci ................... H02J 7/025 |

FOREIGN PATENT DOCUMENTS

| | | |
|---|---|---|
| CN | 104104324 A | 10/2014 |
| DE | 102010026780 A1 | 1/2012 |
| DE | 102011118397 A1 | 5/2012 |
| DE | 102011076186 A1 | 11/2012 |
| DE | 10 2012 110 495 A1 | 5/2013 |
| DE | 102012208005 A1 | 11/2013 |
| DE | 102013100019 A1 | 7/2014 |
| EP | 0788212 B1 | 4/2002 |
| EP | 2039557 A1 | 3/2009 |
| GB | 2471879 A | 1/2011 |
| WO | 2010098412 A1 | 9/2010 |
| WO | 2010116566 A1 | 10/2010 |
| WO | 2011079215 A2 | 6/2011 |
| WO | 2012051717 A1 | 4/2012 |
| WO | 2015036154 A1 | 3/2015 |

OTHER PUBLICATIONS

English translation of International Preliminary Report on Patentability, dated Nov. 30, 2017, of corresponding International application No. PCT/EP2016/060775; 8 pgs.

Examination Report dated of corresponding German application No. 10 2015 006 310.3; 7 pgs.

International Search Report dated of corresponding International application No. PCT/EP2016/060775; 18 pgs.

Chinese Office Action dated Feb. 3, 2020, in connection with corresponding CN Application No. 201680028981.8 (15 pgs., including machine-generated English translation).

* cited by examiner

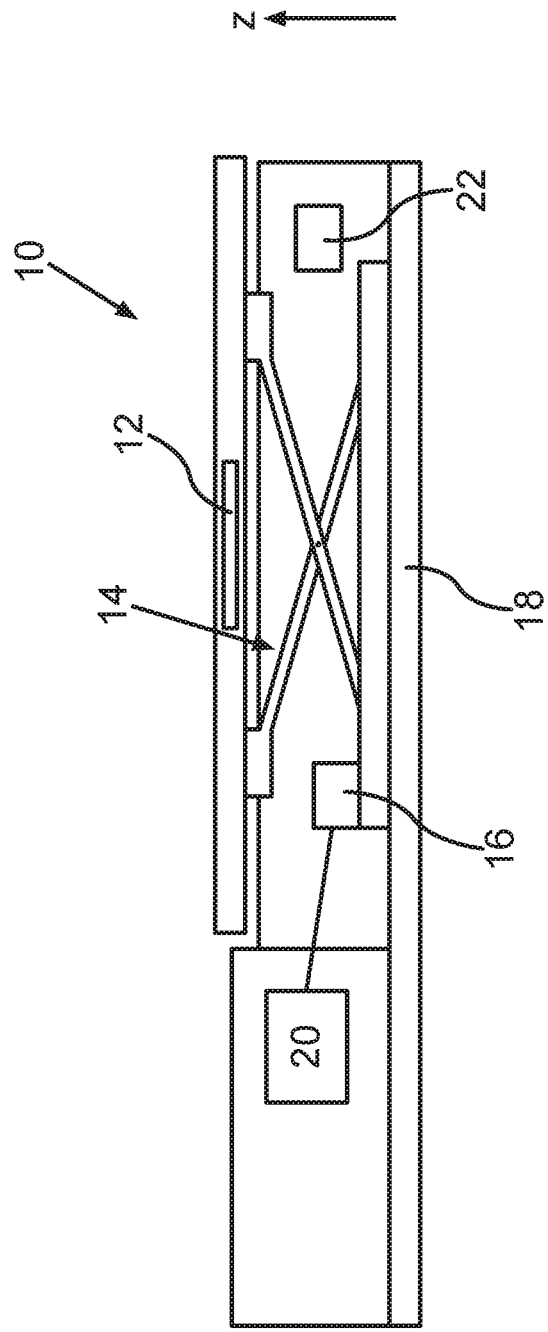

CHARGING DEVICE FOR INDUCTIVELY CHARGING AN ELECTRICAL ENERGY STORE OF A MOTOR VEHICLE AND METHOD FOR OPERATING A CHARGING DEVICE

FIELD

The invention relates to a charging device for inductively charging an electrical energy store of a motor vehicle. In addition, the invention relates to a method for operating such a charging device.

BACKGROUND

DE 10 2010 026 780 A1 describes a method for measuring a temperature with contactless transmission of energy. With the contactless transmission of energy for charging a battery of a motor vehicle between a receiver for receiving the energy and a transmitter for transmitting the energy, the temperature is measured in the area between the transmitter and the receiver.

WO 2010/116566 A1 describes an inductive power supply device. In this case, freezing is monitored by means of a movable coil of the inductive power supply device.

DE 10 2011 076 186 A1 describes a charging device for inductive charging of an electrical energy store of a motor vehicle. The charging device comprises a primary coil, which is designed to induce a voltage in a secondary coil of the motor vehicle for charging the electrical energy store. The charging device comprises in addition also a lifting mechanism, which is designed to move the primary coil between a stored position and a charging position. The primary coil is in this case arranged in a ground induction plate which can be moved by means of a lifting mechanism. The ground induction plate can be pivoted or shaken by the lifting mechanism in order to get rid of animals, leaves or other objects, or to remove moisture, at least partially, from the upper surface of the ground induction plate which is facing a bottom surface of the motor vehicle during the charging operation.

In the case of these types of charging devices that are provided with a lifting mechanism, problems can occur when the temperatures are at or below the freezing point and in particular under the conditions of humid weather, wherein the moisture on the lifting mechanism can cause problems of the lifting mechanism. In particular when movable parts of the lifting mechanism freeze, such as for example joints, movable struts, bellows or the like, a problem-free activation of the lifting mechanism may be restricted or even prevented. The efficiency during inductive charging of an energy storage device of a motor vehicle can thus be significantly limited, or the charging process as such may not be even possible under certain conditions because the primary coil may no longer be moved if the lifting mechanism is frozen to the charging position, in which the gap between the primary coil and the secondary coil should be as small as possible.

SUMMARY

The objective of the present invention is to provide a charging device, as well as a method for operating a charging device, by means of which reliable inductive charging of an electrical energy store of a motor vehicle can be ensured even under wintery weather conditions.

The charging device according to the invention for inductively charging an electrical energy store of a motor vehicle comprises a primary coil, which is designed to induce a voltage in a secondary coil of the motor vehicle for charging the electrical energy store. The charging device comprises in addition also a lifting mechanism, which is designed to move the primary coil between a stored position and a charging position. In order to ensure reliable functionality, which is in particular independent of weather conditions, the charging device according to the invention is provided with a control device designed to operate the lifting mechanism in a deicing mode, in which the lifting mechanism is moved according to a predetermined movement cycle between the stored position and the charging position. Therefore, the lifting mechanism can be operated in said deicing mode, in which the lifting mechanism is moved according to a movement cycle that can be preset between the storage position and the charging position so that freezing of the lifting mechanism is prevented or so that the ice formation on the lifting mechanism can be dissolved.

In particular the movable parts of the lifting mechanism and parts of the lifting mechanism that are movable relative to each other can thus be maintained free of ice with reliability also under unfavorable weather conditions, or they can be deiced, which is to say with temperatures at or below the freezing point and with a relatively high humidity. Therefore, the charging device can be used with reliability also under wintery weather conditions, because the lifting mechanism can be maintained free of ice as a result of a deicing mode that can be activated, and wherein the ice can be therefore removed so that the functionality can be preserved. In particular, the control device is designed to determine the probability that the lifting mechanism can freeze. This probability can be determined for example based on a temperature and/or humidity measured in the area of the lifting mechanism.

If this probability exceeds a certain threshold, the lifting mechanism is operated in said deicing mode, in which the moving parts of the lifting mechanism are moved, for example with recurring small movements in the form of lifting cycles of the movable parts of the lifting mechanism. This can prevent freezing of the lifting mechanism. However, if the lifting mechanism is already partially or completely frozen, this can be also used to melt ice layers that have been already formed, so that the force of a drive device is then again sufficient to adjust the lifting mechanism.

According to an advantageous form of the invention it is provided that the control device is designed to activate the deicing mode as a function of the provided weather data, in particular data with respect to ambient temperature and with respect to ambient moisture. The weather data can include for example the temperature in the area of the melting mechanism and/or the moisture in the area of the lifting mechanism. For example, a limiting temperature can be stored in the control device, for instance as 2 degrees, 1 degree, or 0 degrees. If it is detected based on the weather data provided by the control device that the current temperature in the area of the lifting mechanism is below this limiting temperature, the control device is designed to activate the deicing mode. In addition, it is also possible that the control device is designed so that if moisture is detected based on the provided data in the area of the lifting mechanism, the current moisture in the area of the lifting mechanism is compared to a threshold value for moisture. If the moisture in the area of the lifting mechanism is higher than what it should be based on the predetermined threshold value for moisture, the control device is adapted to activate the deicing mode. This is carried out in particular in combination with the monitoring of said limiting temperature, so that a probability can be determined in this manner that the lifting mechanism could freeze. The control device can be also designed to activate the deicing mode preventively, so that freezing of the lifting mechanism can be prevented based on shaking movements or other kinds of movements at the lifting mechanism, so that the risk of freezing can be significantly reduced.

According to an advantageous embodiment of the invention it is provided that the control device is adapted to change the movement cycle as a function of the provided weather data. For example, the control device can be designed to adjust a corresponding frequency, a stroke, the number of strokes and the like according to the weather data that is supplied. If the temperature in the area of the lifting mechanism is for example below the freezing point and a high air humidity is prevalent in the area of the lifting mechanism, the control device can set the movement cycle for example in such a way that the lifting mechanism will be moved in the deicing mode back and forth with a particularly high frequency and with a relatively high number of strokes. The control device is adapted to change essentially all the movement parameters of the lifting mechanism as a function of the provided weather data in such a manner that the probability of freezing of the lifting mechanism is reduced as much as possible, or so that ice formations that are already present can be melted away in the best possible manner.

According to another preferred embodiment of the invention it is provided that the charging device is provided with a sensor device for providing the weather data and/or with a communication device for receiving the weather data. The control device is in this case designed to receive in particular data regarding the temperature and the moisture in the area of the lifting mechanism from the sensor device and/or from the communication device, in particular so that when both the sensor device and said communication device are provided, the provision of redundant data regarding the weather data, which is to say in particular data regarding the temperature and the moisture, enables a particularly reliable functioning of the charging device because thanks to the fact that a corresponding weather data can be provided at any time, the deicing mode can be activated as a function of this data. Freezing of the lifting mechanism and in particular freezing of the movable parts or parts of the lifting mechanism that can be moved relative to each other can be reliably prevented.

According to another preferred embodiment of the invention it is provided that the control device is designed to activate the deicing mode for a predetermined period of time before an imminent charging operation. For example, vehicle-specific information can be exchanged via a communication system with the charging device. When a motor vehicle is located in the vicinity of the charging device or is approaching the charging device, the control device can obtain a corresponding signal. In this case, it is likely that a charging operation of the relevant motor vehicle is about to take place by means of the charging device. Even before the actual charging process starts, the deicing mode is activated by means of the charging device so that previously frozen parts or potentially frozen parts of the lifting mechanism will be deiced. Therefore, this makes it possible to ensure that an imminent charging operation can be in any case carried out without any problems.

According to another advantageous embodiment of the invention it is provided that the control device is adapted to activate the deicing mode if a force is applied for adjusting the lifting mechanism which is greater than a predetermined force value. For example, it can be provided that the control device is connected to a drive device of the charging device, such as for example an electric engine or the like, by means of which the lifting mechanism can be adjusted. The control device can thus tap information or data characterizing the force applied or to be applied in order to adjust the lifting mechanism. The predetermined force value is in this case greater than the force that is usually required to be applied to the lifting mechanism when it is not frozen. However, when it is necessary to apply a force that is greater than the predetermined force value during the adjustment of the lifting mechanism, this could be an indication that the lifting mechanism is at least partially frozen and therefore operates less smoothly than usual. It is therefore detected, at the latest during the adjustment of the lifting mechanism, whether the mechanism is frozen. For such an eventuality, the control device is designed to activate the deicing mode so that the lifting mechanism will be deiced as quickly as possible and so that a reliable charging operation can be ensured by means of the charging device.

According to another preferred embodiment of the invention it is provided that the control device is designed to activate the icing mode if the value of a charging current during the charging of an electrical energy store falls below a predetermined charging current value. This is because one reason for this could be that it was not possible to move the lifting mechanism completely from the stored position into the final charging position, for example because the lifting mechanism is frozen. For such an eventuality, the control device is adapted to activate the deicing mode so that a potentially frozen lifting mechanism can be deiced as quickly as possible. The lifting mechanism can therefore be moved to the charging position as desired or as required and a particularly efficient charging operation can thus be ensured.

According to another preferred embodiment of the invention it is provided that the control device is designed to activate and deactivate the deicing mode in predetermined cyclic intervals. This makes it possible to ensure that the lifting mechanism will be kept free of ice without a major measurement control expense. The modes of operation of the control device listed above for activating and deactivating the deicing mode can be also combined with one another.

According to a preferred embodiment of the invention it is provided that the stroke with which the lifting mechanism can be moved in the deicing mode between the stored position and the charging position is smaller than the maximum stroke of the lifting mechanism. For example, the lifting mechanism can be provided with a stroke of 15 centimeters, wherein the lifting mechanism can be moved from the stored position into the charging position and back again. The stroke with which the lifting mechanism can be moved in the deicing mode between the stored position and the charging position is in this case selected to be significantly smaller than the stroke mentioned in the example above, for example only at 0.5 centimeters. On the one hand, the safety of the charging device can be thus significantly improved because the primary coil is only relatively slightly lifted during the deicing mode and therefore it does not represent a potential danger. This is because the charging device is usually integrated in the area of a parking place or the like, so that the primary coil can be moved by means of the lifting mechanism during a charging operation or before a charging operation into the required position. Therefore, since the stroke is set so low in the deicing mode, the secondary coil protrudes only slightly beyond the ground area surrounding the charging device. In addition, a particularly small stroke also makes it possible to achieve shaking or oscillating movement of the lifting mechanism in a simple manner, so that ice formations can prevented or dissolved particularly efficiently.

According to a method for operating the charging device according to the invention, or according to a preferred embodiment of the charging device according to the invention, the lifting mechanism is operated in a deicing mode so that the lifting mechanism is moved according to a predetermined moving cycle between the stored position and the charging position. Advantageous embodiments of the charging device according to the invention can thus be also regarded as advantageous embodiments of the method according to the invention, wherein the charging device is in particular provided with a means for carrying out steps of the method.

Further advantages, features and details of the invention will become apparent from the following description of preferred embodiments and from the drawings. The features and combinations of features mentioned above in the description as well as the features and combinations of features mentioned below in the description of FIGURES and/or shown individually in the FIGURES can be used not only in the respectively indicated combinations but also in other combinations or individually without deviating from the scope of the invention.

BRIEF DESCRIPTION OF THE DRAWING

FIG. 1 shows a charging device for inductively charging an electrical energy store of a motor vehicle in a schematic lateral sectional view, wherein the charging device is provided with a lifting mechanism which is designed to move a primary coil of the charging device between a stored position and a charging position.

DETAILED DESCRIPTION

FIG. 1 shows a charging device 10 for inductively charging an electrical energy store, not shown, of a motor vehicle comprises a primary coil 12, which is designed to induce a voltage in a secondary coil, not shown here. In order to achieve a particularly high efficiency during the charging operation, it is important to keep the distance between the primary coil 12 and the secondary coil as small as possible. For that reason, the charging device 10 is further also provided with a lifting mechanism 14, which is adapted to move the primary coil 12 in the height direction z of the motor vehicle, which is to say in the vertical direction, between the stored position shown here and an extended charging position. By means of the lifting mechanism 14 it is also possible to move the primary coil 12 closer to a secondary coil of a motor vehicle whose electric energy storage device is about to be inductively charged.

The lifting mechanism 14 can be designed, for example as shown schematically in the FIGURE, in the form of a type of a scissor lift stage. However, other embodiments or effective principles of the lifting mechanism 14 are also possible. The charging device 10 comprises a drive unit 16, by means of which the lifting mechanism can be moved in the vertical direction z between the stored position shown here and the charging position. The lifting mechanism 14 comprises a plurality of movable parts, such as for example joints or struts, not shown here, or the like. An aluminum plate 18 serves as a ground plate of the charging device 10 and is formed as a part of the housing due to properties positively acting on the magnetic field of the charging device 10 generated during the charging process.

In particular in winter weather conditions, which is to say with temperatures at or below the freezing point and at a relatively high air humidity, as well as with moisture on the lifting mechanism 14, there is the risk that inter alia, the movable components of the lifting mechanism 14 or the components that are movable relative to each other will freeze and a reliable operation of the lifting mechanism 14 will thus be compromised.

In order to enable a reliable operation of the lifting mechanism 14 even in winter weather conditions, which is to say to prevent freezing of the lifting mechanism 14 or to enable deicing, the charging device 10 is provided with a control device 20, which is designed to operate the lifting mechanism 14 in a deicing mode, in which the lifting mechanism 14 is moved according to a predetermined movement cycle between the stored position and the charging position. The control device 20 is for this purpose connected to the drive unit 16, wherein the control device 20 can control according the drive device 16 in the deicing mode so that the lifting mechanism 14 is moved according to a precisely predetermined movement cycle between the stored position and the charging position.

The control device 20 is adapted to activate said deciding mode as a function of the provided weather data, in particular with respect to the ambient temperature and to the ambient humidity. The charging device 14 is for this purpose provided with a sensor device 22, which is adapted to measure the temperature and the air humidity in the area of the lifting mechanism 14 and to provide the corresponding data to the control device 20. As an alternative or in addition, it is also possible that the charging device 10 is provided also with a communication device, not shown here, which is used to receive weather data, i.e. in particular temperature data and air humidity data, preferably wirelessly. For example, the weather data can be received by said communication device in the form of online weather data and they can be provided to the control device 20.

It can be for example provided that a limiting temperature of for instance 2 degrees, 1 degree or 0 degrees is preset, so that the deicing mode is activated by means of the control device 20 as soon as the temperature in the area of the charging device 10 or of the lifting mechanism 14 falls below this limiting temperature. Furthermore, it can be also provided that the control device 20 activates the deicing mode when the air humidity measured in the area of the charging device 10 and in particular in the area of the lifting mechanism 14 is higher than a predetermined threshold value and the temperature in the area of the lifting mechanism 14 is below said limiting temperature.

The control device 20 is in addition adapted to vary the moving cycle according to which the lifting mechanism 14 is moved back and forth in the deicing mode as a function of the provided weather data. If the temperature is for example barely above the freezing point or at the freezing point, it may be for example sufficient when the lifting mechanism is moved back and forth in relatively long time intervals in order to prevent freezing of the lifting mechanism 14. However, if the temperature is well below the freezing point and a relatively high air humidity is also present, it can be advantageous when the control device 20 selects the moving cycle 20 in such a way that the lifting mechanism is moved relatively frequently back and forth, with a high frequency and with a relatively large number of strokes in order to prevent freezing of the lifting mechanism 14, and in particular to prevent freezing of the parts of the lifting mechanism 14 that are movable relative to each other.

The control device 20 is in addition designed to activate the deicing mode for a predetermined period of time before an imminent charging operation. The charging device 10 can be for example in communication via a communication system, not shown in the FIGURE, with another motor vehicle to be charged. If for example a motor vehicle is approaching the charging device 10 or is in its immediate vicinity, the control device 20 can activate the deicing mode as a precaution so that the charging device 10 and in particular the lifting mechanism will remain functional and free of ice. The control device 20 can be for example adapted so that the deicing mode is activated 5 minutes, or even 10 minutes, or even a few seconds before an anticipated and imminent charging operation. This predetermined time interval in which the deicing mode is activated can be preset for example as a function of the temperature and of the moisture in the area of the lifting mechanism 14. This makes it possible to ensure problem-free functioning of the lifting mechanism in advance of an imminent charging operation.

Furthermore, the controller 20 can be also designed to activate the deicing mode if a force is applied for adjusting the lifting mechanism which is greater than a predetermined force value. The predetermined force value will in this case be selected so as to be greater than a force that is required to adjust a lifting mechanism 14 which is free of ice. Therefore, if a force is applied by means of the drive unit 16 during the activation of the lifting mechanism 14 for moving the primary coil 12 from the stored position into the charging position which is greater than the predetermined force value, this could be an indication that the lifting mechanism 14 is frozen. As a result, the control device 20 activates the deicing mode in order to dissolve and remove potential ice formations. If it is now detected due to the activated deicing mode, for example based on an oscillating movement, that the force required for a further adjustment of the lifting mechanism 14 is again smaller that the predetermined force value, the control device can optionally deactivate the icing mode and then control the lifting mechanism 14 so that the lifting mechanism will be moved to the desired position.

In addition, the control device 20 can be also designed to activate the deicing mode if a charging current falls during the charging of an electrical energy store of a motor vehicle below a predetermined charging current value. This could be an indication that it was not possible to move the lifting mechanism completely to the charging position, for example because certain movable components of the lifting mechanism or components that are movable relative to each other are frozen. If the gap between the primary coil 12 and the relevant secondary coil of the motor vehicle to be charged is too big, this will result in a reduced charging current during the charging of the motor vehicle. In such a case it can be provided that the deicing mode of the control device 20 is activated to allow the lifting mechanism 14 to be extended into the charging position.

The charging device 20 can be in addition also designed to activate and deactivate the deicing mode in predetermined cyclical intervals. This can be carried out for example depending on the weather, which is to say when temperatures in the minus range are prevalent and when an increased air humidity is measured. The activation and deactivation of the deicing mode can thus be used to ensure that the lifting mechanism 14 is always moved again so that it does not be freeze and so that the charging device 10 can thus be kept operational even in frosty temperatures.

It is preferred when the stroke according to which the lifting mechanism 14 is movable in the deicing mode between the storage position and the charging position is smaller than the maximum stroke of the lifting mechanism 14. For example, the lifting mechanism 14 may be provided with a maximum stroke of 15 centimeters. Preferably, the stroke with which the lifting mechanism is can be moved in the deicing mode is selected to be significantly smaller than 15 centimeters, for example as 0.5 centimeters. As a result, since the lifting mechanism 14 is moved only very slightly upward and downward in the deicing mode, the primary coil 12 or the housing surrounding the primary coil 12 will be moved only relatively slightly in the vertical direction z beyond the area of the surrounding ground, for example a parking place or the like, in which the charging device 10 is integrated. As a result, the primary coil 12 will be hardly moved also during the deicing mode in the upward direction and it will essentially remain at the ground level.

A suddenly approaching motor vehicle, which is travelling during the deicing mode toward the toward the charging device 10, will therefore not be damaged. The selection of a relatively small stroke for the deicing mode is additionally also advantageous from the viewpoint that particularly quick shaking or oscillation of the lifting mechanism 14 is also possible as a result of the relatively small traversing distance. Ice formations that may be potentially formed on the lifting mechanism 14 can thus be dissolved in a particularly simple manner and with reliability. It is preferred when the lifting mechanism 14 is lifted and then again lowered each time only slightly in the deicing mode, starting from said reduced or small predetermined stroke, in order to prevent freezing of the lifting mechanism 14, or even to dissolve ice formations already formed on the lifting mechanism 14.

The invention claimed is:

1. A charging device for inductively charging an electrical energy store of a motor vehicle, comprising:
   a primary coil, which is designed to induce a voltage in a secondary spool of the vehicle in order to charge an electrical energy store; and
   a lifting mechanism, which is designed to move the primary coil between a stored position and a charging position,
   wherein the charging device is provided with a control device, which is adapted to operate the lifting mechanism in a deicing mode, in which the lifting mechanism is moved according to a predeterminable moving cycle between the stored position and the charging position, and
   wherein the control device is designed to activate the deicing mode if a charging current falls during the charging of an electrical energy store of a motor vehicle below a predetermined charging current value.

2. The charging device according to claim 1, wherein the control device is further configured designed to activate the deicing mode as a function of a provided weather data, in particular with respect to an ambient temperature and to an ambient air humidity.

3. The charging device according to claim 2, wherein the control device is designed to vary the movement cycle as a function of the provided weather data.

4. The charging device according to claim 2, wherein the control device includes a sensor arrangement for providing the weather data and a communication device for receiving the weather data.

5. The charging device according to claim 1, wherein the control device is designed to activate the deicing mode for a predetermined period of time before an imminent charging operation.

6. The charging device according to claim 1, wherein the control device is further configured designed to activate the deicing mode if a force is applied for the adjustment of the lifting mechanism which is greater than a predetermined force.

7. The charging device according to claim 1, wherein the control device is designed to activate and deactivate the deicing mode in predetermined cyclical intervals.

8. The charging device according to claim 1, wherein a stroke according to which the lifting mechanism is moved in the deicing mode between the stored position and the charging position is smaller than a maximum stroke of the lifting mechanism.

\* \* \* \* \*